May 29, 1934.  M. HANSEN  1,960,939
SEAT SUPPORT FOR TRACTORS
Filed May 31, 1932
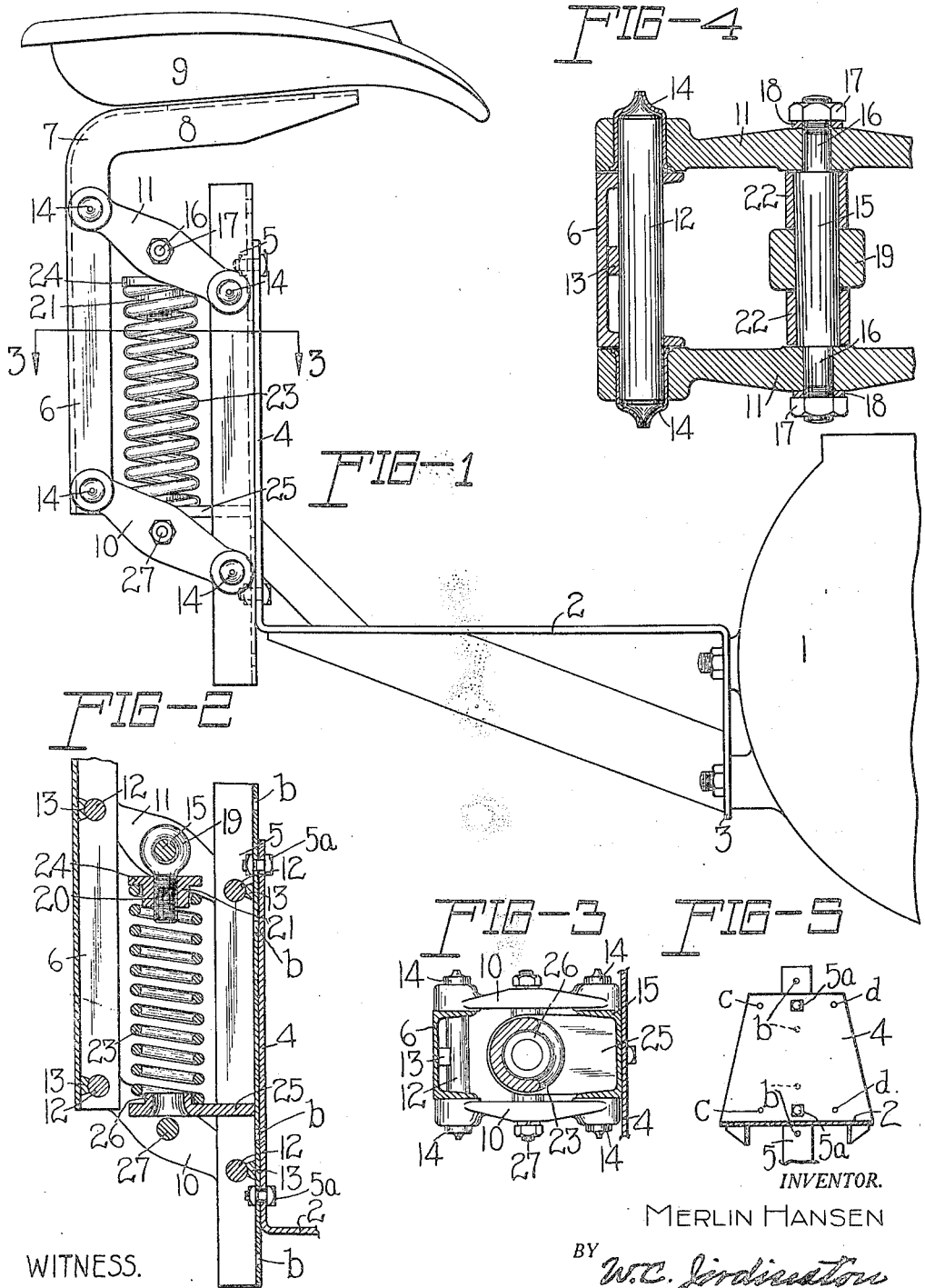
WITNESS.
Edward Melin.
INVENTOR.
MERLIN HANSEN
BY W.C. Jirdiseaton
ATTORNEY.

Patented May 29, 1934

1,960,939

UNITED STATES PATENT OFFICE 1,960,939

SEAT SUPPORT FOR TRACTORS

Merlin Hansen, Waterloo, Iowa, assignor to John Deere Tractor Company, Waterloo, Iowa, a corporation of Iowa Application May 31, 1932, Serial No. 614,603

7 Claims. (Cl. 155—51)

My invention relates to seat supports adapted for use in numerous situations but more particularly valuable on tractors and agricultural machinery, and an object of my invention is to provide a support, on which a seat is mounted, possessing a resiliency that will materially add to the comfort of an occupant and the longevity of a machine on which my invention is used.

Referring to the drawing in which similar numerals indicate identical parts—

Figure 1 is a side elevation of my invention a mounted on a tractor;

Figure 2 is a vertical longitudinal section with the seat omitted illustrating the coactive parts;

Figure 3 is a section on the line 3—3 of Figure 1;

Figure 4 is an enlarged detail section of a pivot bearing; and,

Figure 5 is a front view, in reduced scale, of the plate on which the seat support is mounted.

A platform is shown rigidly mounted on a rear part 1 of a tractor, and consists of a horizontal portion 2, a downwardly extending part 3 bolted to the part 1, and a rear vertical plate 4 on which my device is supported. A vertically disposed channel bar 5 is secured to the plate 4 by bolts 5a which extend through the plate 4 and the web of the channel bar 5. Parallel with the bar 5 is a channel bar 6 bent at 7 to extend forwardly to form a support 8 on which the seat 9 is secured.

The bars 5 and 6 are spaced apart, with the channels facing each other, and are connected one with the other at their lower ends by parallel links 10 pivotally mounted on opposite sides of the bars 5 and 6; similar links 11 connect the upper parts of the bars 5 and 6 to which the links are pivotally attached in parallelism with each other and with the links 10. The pivotal connections of the links 10 and 11 with the bars 5 and 6 are alike, one being illustrated in Figure 4, and includes a shaft 12 extending transversely of the bar 6 through the flanges thereof and projecting beyond the flanges a sufficient distance to operate as bearings for the links 11. To prevent the shaft from turning, and to add to stiffness of the structure, the shaft is welded to a member 13 which is welded to the transverse center of the web of the bar 6. The openings in the links 10 and 11, through which the shafts 12 extend, are provided with bushings 14 pressed therein with their inner ends spread to fit closely over the rounded adjacent ends of the bushings. The outer ends of the bushings are formed into nipples to receive a grease gun when lubrication is necessary.

A spacing bolt 15 is located between the links 11, its reduced and threaded ends 16 passing through holes in the links. Nuts 17 outside of the links 11 secure the bolt in place, and between the bolts and the links are split washers 18. Centrally an eye bolt 19 is carried on the spacing bolt 15 having its threaded part 20 extending downwardly; a flanged nut 21 is mounted on the threaded part 20. The central position of the eye bolt on the spacing bolt is assured by collar 22 on the spacing bolt and the inner sides of the links 11. A vertically disposed coiled spring 23 is positioned between the bars 5 and 6 and parallel with them, the upper end of the spring encircling the nut 21 and in contact with the flange 24 thereon. The lower end of the spring 23 rests on a bracket 25, welded to the bar 5, and encircles a projection 26 on the bracket. The expansive power of the spring 23, it is evident, is exerted to hold the seat 9 up in the position shown, and to limit its rising movement I employ a spacing bolt 27 secured centrally to the links 10 and adapted to contact with the under side of the bracket 25, the threaded ends of the bolt 27 passing through the links 10 and secured by suitable nuts on the outside of the links.

It is evident that the weight of an occupant of the seat 9 will cause the bar 6 to move downwardly and compress the spring 23 to a greater or lesser degree, the connection of the bar 6 to the bar 5 by parallel links of equal length ensuring a true vertical movement of the bar 6 and contributing materially to the easy riding and comfort of the operator. It is also true the spring 23 will absorb any shock experienced when the machine, to which my device may be attached, is traveling over a rough surface. The expansive power of the spring 23 is easily regulated by turning the nut 21.

The support as a whole can be readily adjusted laterally on the plate 4 by removing the bolts 5a, which secure the bar 5 to the plate 4, then by moving the support laterally on the plate 4 until the holes in the bar 5, from which the bolts have been removed, or similar holes b in the bar 5, register with either holes c or d in the plate according to the direction in which the adjustment is desired, the bolts 5a are then inserted and secured. Normally the bar 5 is secured centrally of the plate 4 and if a vertical adjustment is desired in that position it can be readily effected by the use of the bolts 5a in holes b vertically arranged centrally in the bar 5.

I claim:

1. A seat support for tractors or the like including a vertical stationary bar, a movable bar spaced apart from the stationary bar and parallel therewith, a seat on the movable bar, a link device extending from one bar to the other and pivotally connected therewith, a coiled spring connected with said device, and a support for said spring on the stationary bar.

2. A seat support for tractors or the like including a vertical stationary bar, a movable bar spaced apart from the stationary bar and parallel therewith, a seat on the movable bar, links pivotally connected to the lower ends of said bars, links pivotally connected to the upper end of the stationary bar and to the movable bar and parallel with the lower links, a coiled spring between said bars and connected with the upper links, and means on the stationary bar to support said spring.

3. A seat support for tractors or the like including a vertical stationary bar, a movable bar spaced apart from the stationary bar and parallel therewith, a seat on the movable bar, links pivotally connected to the lower ends of said bars, links pivotally connected to the upper end of the stationary bar and to the movable bar and parallel with the lower links, a bracket secured on the stationary bar and extending toward the movable bar, a coiled spring supported on said bracket and contracted between said bracket and the upper links and connected with the latter.

4. A seat support for tractors or the like including a vertical stationary bar, a movable bar spaced apart from the stationary bar and parallel therewith, a seat on the movable bar, links pivotally connected to the lower ends of said bars, links pivotally connected to the upper end of the stationary bar and to the movable bar and parallel with the lower links, a bracket secured on the stationary bar and extending toward the movable bar, a coiled spring supported on said bracket and contracted between said bracket and the upper links and connected with the latter; and means to adjust the connection and vary the tension of said spring.

5. A seat support for tractors or the like including a vertical stationary bar, a movable bar spaced apart from the stationary bar and parallel therewith, a seat on the movable bar, links pivotally connected to the lower ends of said bars, links pivotally connected to the upper end of the stationary bar and to the movable bar and parallel with the lower links, a bracket secured on the stationary bar and extending toward the movable bar, a coiled spring supported on said bracket and contracted between said bracket and the upper links and connected with the latter, and a stop on the lower links in normal contact with said bracket.

6. A seat support for tractors or the like including a vertical stationary bar, a movable bar spaced apart from the stationary bar and parallel therewith, a seat on the movable bar, links pivotally connected to the lower ends of said bars, links pivotally connected to the upper end of the stationary bar and to the movable bar and parallel with the lower links, a bracket secured on the stationary bar and extending toward the movable bar, a projection on said bracket, a coiled spring supported on said bracket and engaging with said projection, an eyebolt attached centrally to the upper links having a threaded portion extending downwardly within said spring, and a flanged nut on said bolt engaging the upper end of the spring.

7. A seat support for tractors or the like including a vertical stationary channel bar and a movable channel bar, a seat on the latter, said bars spaced apart and parallel and having their channels opposed, links pivotally attached to the lower ends of the flanges of the stationary bar and extending parallel to each other to the lower end of the flanges of the movable bar and pivotally attached thereto, links pivotally attached to the upper end of the flanges of the stationary bar parallel with the lower links and pivotally attached to the movable bar, a bracket mounted on the stationary bar between the flanges thereof and extending toward the movable bar, a coiled spring supported on said bracket and contracted between said bracket and the upper links to which said spring is connected.

MERLIN HANSEN.